(12) United States Patent
Zhang (10) Patent No.: US 7,742,485 B2
(45) Date of Patent: Jun. 22, 2010

(54) DISTRIBUTED SYSTEM FOR DELIVERY OF INFORMATION VIA A DIGITAL NETWORK

(75) Inventor: Xinyan Zhang, Nanjing (CN)

(73) Assignee: Roxbeam Media Network Corporation, Beijing (CN)

( * ) Notice: Subject to any disclaimer, the term of this patent is extended or adjusted under 35 U.S.C. 154(b) by 851 days.

(21) Appl. No.: 11/192,760

(22) Filed: Jul. 29, 2005

(65) Prior Publication Data

US 2007/0025363 A1   Feb. 1, 2007

(51) Int. Cl.
*H04L 12/28* (2006.01)
(52) U.S. Cl. .................. 370/400; 370/229; 370/235; 370/351; 370/352; 370/392; 370/503
(58) Field of Classification Search .......... 370/229, 370/235, 351, 352, 400, 432, 503, 392
See application file for complete search history.

(56) References Cited

U.S. PATENT DOCUMENTS

| | | | |
|---|---|---|---|
| 6,529,906 B1 * | 3/2003 | Chan | 707/8 |
| 7,324,555 B1 * | 1/2008 | Chen et al. | 370/468 |
| 2001/0027479 A1 | 10/2001 | Delaney et al. | |
| 2003/0026254 A1 * | 2/2003 | Sim | 370/392 |
| 2003/0210686 A1 * | 11/2003 | Terrell et al. | 370/389 |
| 2006/0268742 A1 * | 11/2006 | Chu et al. | 370/254 |

OTHER PUBLICATIONS

Department of Information Engineering, The Chinese University of Hong Kong; School of Computing Science, Simon Fraser University; and Department of Computer Science, Hong Kong University of Science and Technology, Authors: Xinyan Zhang, Jiangchuan Liu, Bo Li, and Tak-Shing Peter Yum, Data-Driven Overlay Streaming: Design, Implementation, and Experience, 14 pages.
IEEE Infocom 2005, "Network Coding for Large Scale Content Distribution", Authors: Christos Gkantsidis and Pablo Rodriguez Rodriguez, 11 pages.

* cited by examiner

*Primary Examiner*—Dang T Ton
*Assistant Examiner*—Nourali Mansoury
(74) *Attorney, Agent, or Firm*—Park, Vaughan & Fleming LLP (57) ABSTRACT

A system for delivering streamed content over a large digital network such as the Internet. Distributed functionality executes on nodes in the network to achieve functions such as assigning partner nodes for transfer of content to or from a target node, scheduling transfer operations among nodes, adding or removing nodes from the network, maintaining security, and other operations. Different embodiments may use one or more of the functional features. In a preferred embodiment, video content is segmented and streamed through multi-path routing. An overlay network uses nodes in partnership groups so that a target node can obtain segments from multiple sources. Partner nodes can provide the segments within a given time window, including simultaneous delivery from multiple partner nodes, so that a more reliable data stream is supported.

12 Claims, 6 Drawing Sheets

DISTRIBUTED SYSTEM FOR DELIVERY OF INFORMATION VIA A DIGITAL NETWORK

BACKGROUND OF THE INVENTION

The Internet has proven to be very useful and effective at transferring information over large distances and to many users. However, certain "high bandwidth" types of information such as video or image data can tax or exceed the Internet's ability to deliver the information in a timely and reliable manner. For example, one type of high bandwidth data, or "content," includes streamed video where the video content is delivered in real time. Such real time delivery typically requires that the information be received at multiple destinations within a small time window so that the information is received at or near the time it is displayed or presented to a user. The delivery of real time video content is made more difficult in "multicast" applications where a streamed video program is simultaneously provided to many viewers.

Attempts have been made to improve the Internet's ability to transfer large amounts of information, such as large files. Such attempts include using peer-to-peer transfers as opposed to client-server transfers so that a receiver of the content is not limited to one or a few sources of the content. This is an approach used, for example, in a popular file-sharing system referred to as "Bittorrent." However, the Bittorrent approach may not work well for streamed content as the absence of one part of a file can cause dropouts or artifacts in a real time display of the content.

Streamed content is also vulnerable to service fluctuations over the network's delivery route. Because of the technical problems encountered when large amounts of information are sent to many destinations, improvements in the delivery of high bandwidth content over large networks such as the Internet are desired.

SUMMARY OF THE INVENTION

A preferred embodiment of the invention is designed to deliver streamed content over a large digital network such as the Internet. Distributed functionality executes on nodes in the network to achieve functions such as assigning partner nodes for transfer to or from a particular node, scheduling transfer operations among nodes and adding or removing nodes from the network. Different embodiments may use one or more of the functional features. In a preferred embodiment, video content is segmented and streamed through multi-path routing. An overlay network uses nodes in partnership groups so that a target node can obtain segments from multiple sources. Partner nodes can provide the segments within a given time window, including simultaneous delivery from multiple partner nodes, so that a more reliable data stream is supported.

In one embodiment the invention provides a method for distributing information in a digital network, wherein the digital network includes nodes coupled by communication links, the method comprising: performing the following at each of a plurality of the nodes: maintaining a record of other nodes in the digital network; associating partner nodes for a target node from the record of other nodes; and scheduling transmission of segments of the information wherein the segments include portions of the information to be presented within a predetermined time window.

In another embodiment the invention provides A method for grouping nodes in a digital network for subsequent transfer of information among the grouped nodes, the method comprising: designating a first node in the digital network; storing an address of the first node in a list at the first node; receiving a transmission from a new node to join an overlay network; sending the list to the new node; updating the list with addresses of subsequent nodes that request to join the overlay network; and scheduling transmission of segments of information among the nodes in the overlay network, wherein the segments include portions of the information to be presented within a predetermined time window.

DETAILED DESCRIPTION OF THE INVENTION

Figure 1:
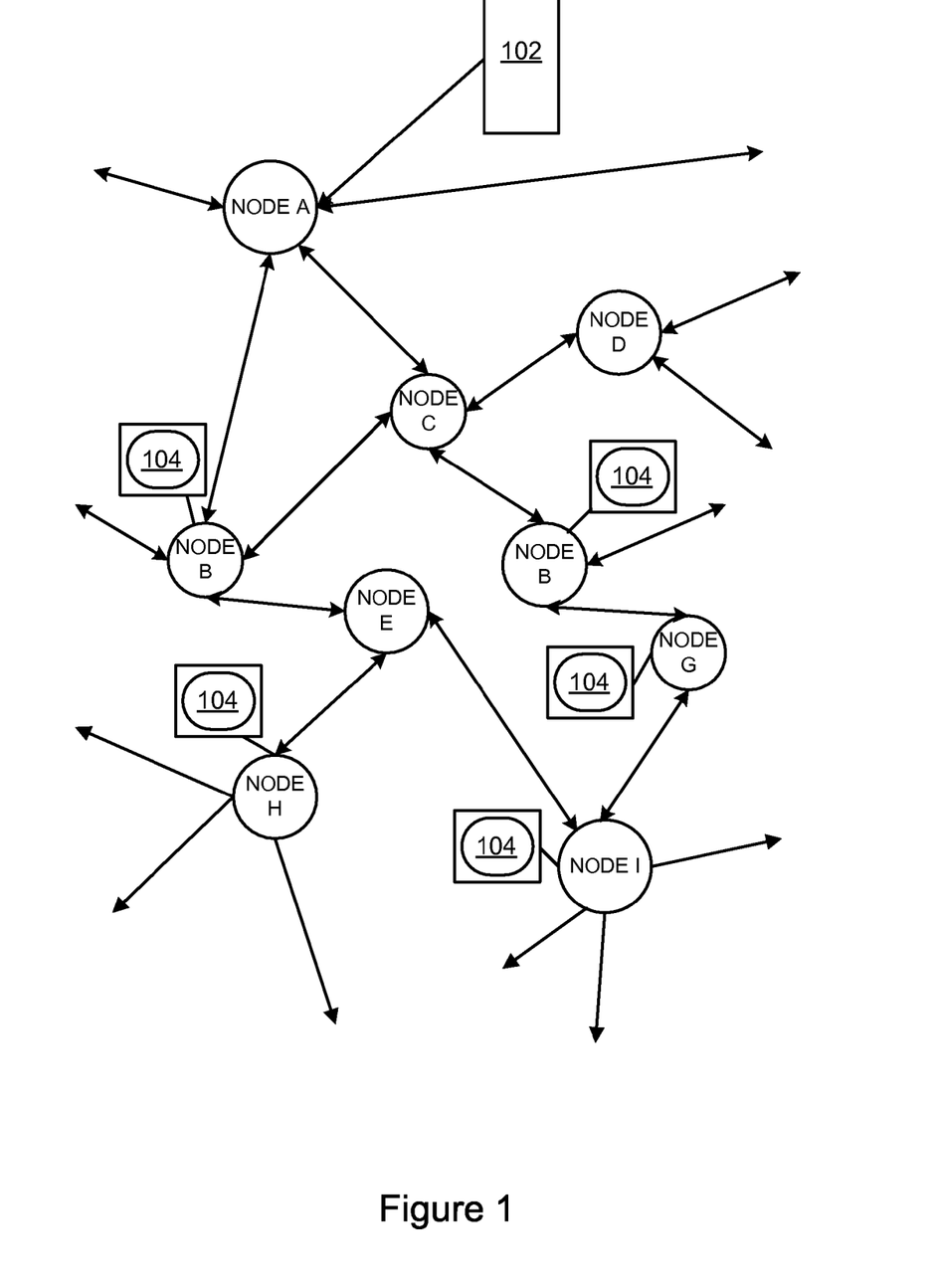
FIG. 1 shows a basic diagram of nodes in a network.

FIG. 1 shows a basic diagram of nodes in a network.

In FIG. 1, nodes such as A-I are interconnected by communication links indicated by arrow lines between the nodes. A node can be any type of network device (e.g., router, switch, server, client, firewall, etc.), processing device or other device or hardware or software component that can transfer, store, control, process or otherwise manipulate or handle data.

Communication links can be hardwired, wireless, optical or other suitable types of links. Note that FIG. 1 is a simple generalized diagram for purposes of illustrating some network aspects that are relevant to the description herein. A digital network such as the Internet, corporate or campus intranet, local area network (LAN), small or home network, etc., can vary from that shown in FIG. 1.

Server 102 sends video content to node A. Node A is in communication with nodes B and C and can also be in communication with other nodes (not shown). Nodes B and C are in communication with other nodes such as E and F and also communicate with each other. The video content can pass from node-to-node via the communication links to propagate to end-user nodes that are connected to display devices 104 such as computer monitors, display screens, television screens, set-top boxes, etc. Any type of display, player or other presentation device can be used. For example, an end-user node can include an audio player, cell phone, etc. Naturally, any number of nodes, links or devices can be used. In some applications it may be desirable to use more than one server, or source, of the video content. A goal of streaming content is to provide the content efficiently and within a desired time window to the various nodes and end users.

In one embodiment nodes are grouped into partnerships, where any given target node maintains a list of partner nodes. Segments, or portions, of content are obtained from the partner nodes and provided to the target node. The target nodes and partner nodes are selected from among the nodes in the base network (e.g., the Internet). The selected nodes form an "overlay" network upon the base network. Content is streamed or otherwise propagated through the overlay network. When a node in the base network joins the overlay network (e.g., when a human user at an end-user node wants to start watching a program) the new node contacts an origin node (e.g., node A of FIG. 1) which causes a list of candidate partner nodes to be sent to the new node. The new node tries to make a connection to nodes in the list which are candidate partners. One or more partners may be selected based on end-to-end network conditions or other restrictions or performance requirements such as bandwidth, latency, jitter, etc. For example, in FIG. 1 nodes A and C might be designated as partners of target node B. Nodes A, B, D and F might be designated as partner nodes for target node C. In general, any number, grouping, type and arrangement of nodes can be designated as partner nodes for a target node. Any node in the base network can function as either a target, partner node, both target and partner (to a different target node) or neither target or partner node (i.e., the node is not used in the overlay network). The status of a node as target or partner can change with time.

The system strives to supply partner nodes that will result in efficient transfer of content to the target node. This might mean that the partner nodes are one or a few hops away from their target node, or that the nodes in a partnership group (target node and its partner nodes) are in geographic proximity but such limitations need not be used in different embodiments. In general, any rules or criteria can be used to determine partnership groups.

Figure 2:
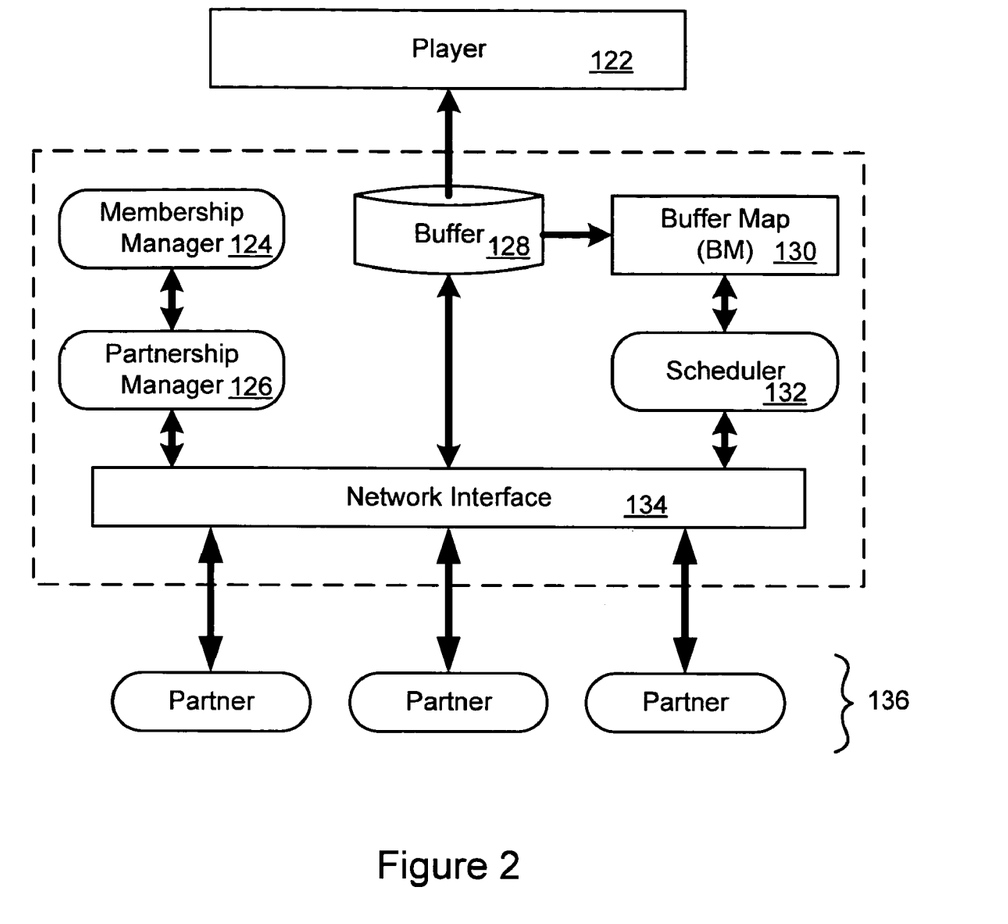
FIG. 2 shows basic processes and modules in a node in an overlay network.

FIG. 2 shows basic relationships of processes and modules in a node in the overlay network. Details of an implementation of the processes is described in the paper "Data-Driven Overlay Streaming: Design, Implementation, and Experience," by Zhang, Liu, Li and Yum, Department of Information Engineering, The Chinese University of Hong Kong, Shatin, N.T., Hong Kong which is hereby incorporated by reference as if set forth in full in this document for all purposes. Other processing and details of various node components are also described in the co-pending patents referenced, above.

In FIG. 2, node 120 includes modules membership manager 124, partnership manager 126 and scheduler 132. Buffer 128 is used to store content prior to display or presentation via player process 122. In a preferred embodiment, all nodes include all of the processes. Note that non-end user nodes, or intermediary nodes, can be used and need not have a player. The intermediary nodes (target and partner nodes) will store content in buffer 128 for retransmission to another node, rather than for display at a player. In general, a node or other process, circuit or device intended to perform the functionality described herein may not need to have all of the components shown in FIG. 2. Buffer map (BM) 130 is used to indicate availability of segments and is discussed in more detail, below.

Network interface 134 is used by node 120 to communicate with other network devices or processes such as partner nodes 136. The network interface can be implemented with any suitable processes, devices, circuitry, protocols, or other components. For example, a preferred embodiment uses standard Internet components such as Internet Protocol (IP). However, other embodiments can use other protocols, standards or any other suitable components.

Partner nodes are used to supply segments to the target node according to a scheduling process. Segment availability information is periodically exchanged between a node and its partners. An exception is the video source node, or origin node, which is always a supplier.

Nodes are identified and tracked in node lists. The list entries use a node identifier which, in a preferred embodiment, is the node IP address. Each node maintains a membership cache (mCache) containing a partial list of the node identifiers for active nodes in the overlay network. A new node that is to join the overlay network first contacts the origin node which randomly selects a deputy node from its mCache and redirects the new node to the deputy. The new node then obtains a list of partner candidates from the deputy, and contacts these candidates to establish its partners in the overlay. Other embodiments can use different identifiers and a different joining scheme. For example, the list of partner candidates can be obtained from any node, process, circuit, device or other component or source. An identifier can include uniform resource locator (URL) information, port numbers, etc. In general, any type of node identification scheme can be used, as desired.

The origin node typically persists during the lifetime of streaming and its identifier/address is universally known. The redirection to a deputy node enables more uniform partner selections for newly joined nodes, and can minimize the origin node's load. Other approaches to node joining are possible.

Each node periodically generates a membership message to announce its existence as an active node. Each message is a 4-tuple of <seq_num, id, num_partner, time_to_live>, where seq_num is a sequence number of the message, id is the node's identifier, num_partner is its current number of partners, and time_to_live records the remaining valid time of the message. A preferred embodiment uses the Scalable Gossip Membership protocol, SCAM, to distribute membership messages among overlay nodes. Details of SCAM can be found, for example, in "Peer-to-peer membership management for gossip-based protocols," IEEE Transactions on Computers, February 2003. Any suitable inter-node communication scheme can be used. Upon receiving a message of a new seq_num, the node updates its mCache entry, or creates the entry if the corresponding node entry is not present. The entry is a 5-tuple <seq_num, id, num_partner, time_to_live, last_update time>, where the first four components are copied from the received membership message, and the fifth is the local time of the last update for the entry.

Entries in the mCache are also updated when a membership message is forwarded to other nodes; and when a node serves as a deputy and the entry is to be included in the partner candidate list. In either case, time_to_live is decreased by current_local_time-last_update_time. If the new value is less than or equal to zero, the entry is removed while not forwarded or included in the partner list; otherwise, num_partner is increased by one in the deputy case.

Figure 3:
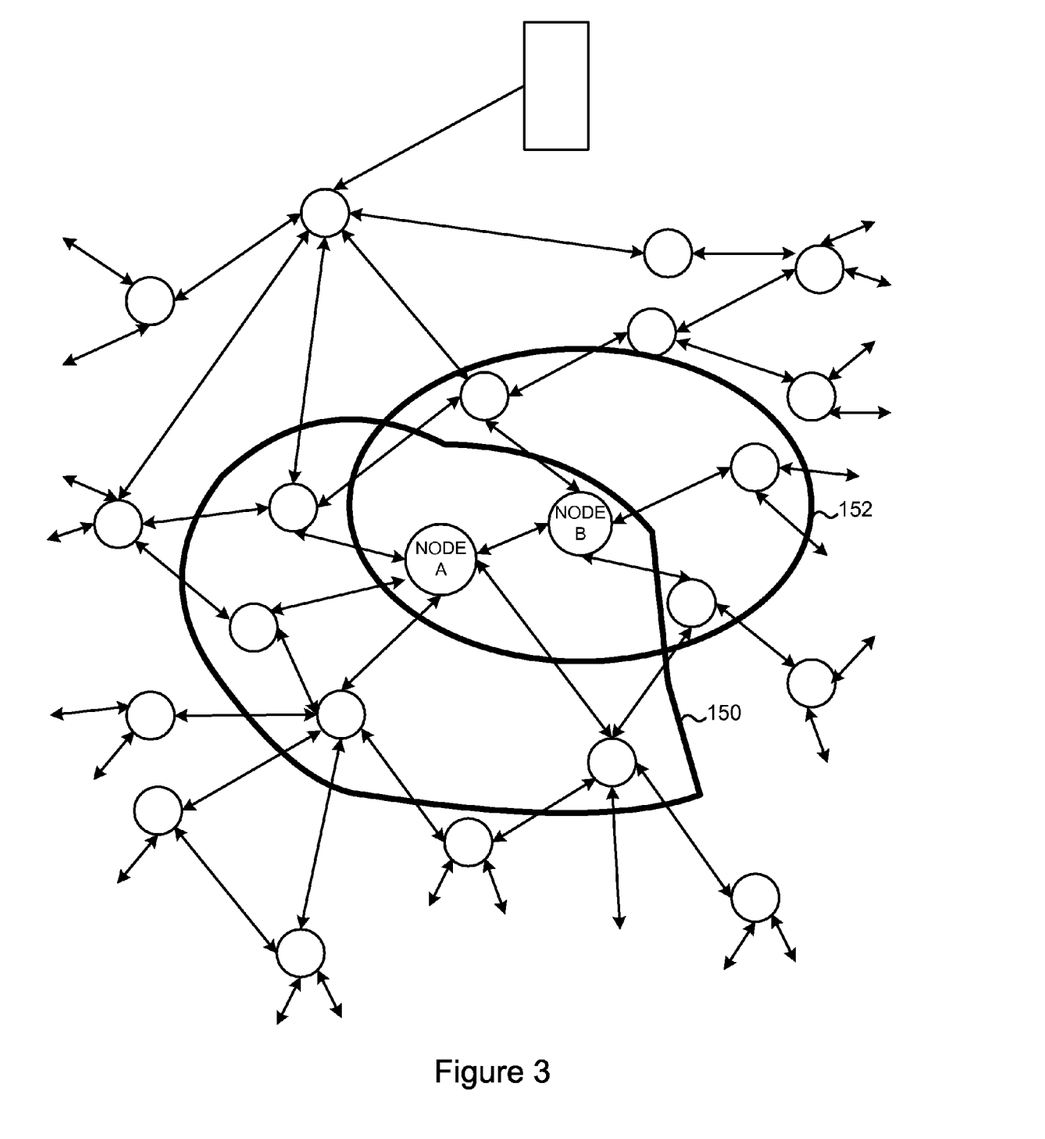
FIG. 3 shows an example of node partnership groups.

An example of the partnership groups is shown in FIG. 3. Node A is a target node for a partnership group that includes 5 other nodes within region 150. Similarly, node B is a target node for the partnership group that includes 4 other nodes in region 152. Note that nodes A and B function as both target and partner nodes. In general, a node can belong to any number of partnership groups and can function as a target, partner or both target and partner types of node. Nodes can perform other functionality in addition to the functionality described herein. Partnership groups, data transmission directions and functionality can change before, after or during a streaming operation. A node may change partners based on any performance criteria. In a preferred embodiment, factors of data availability of a partner and end-to-end performance. A node can change partners based on the status of data receiving from the partners. For example, if a receiving node determines that needed segments are not being received on time then partner changing is initiated by the receiving node.

A video stream is divided into segments of a uniform length, and the availability of the segments in the buffer of a node is represented by a Buffer Map (BM). Each node continuously exchange its BM with the partners, and then schedules which segment is to be fetched from which partner accordingly. In a preferred embodiment, each segment contains 1-second of video. Since time lags due to latency of over 1 minute are typically highly unlikely, a sliding window of 120-segments is used to cover 2 minutes of playback time centered about the current time. This is the requirement for a node's buffer since a partner is not expected to require a segment outside of the window. In a preferred embodiment 120 bits are used to record a BM with bit 1 indicating that a segment is available and 0 otherwise. The sequence number of the first segment in the sliding window is record by another two bytes, which can be rolled back for extra long video programs (>24 hours). Naturally, any other suitable schemes for buffering segments including variations on the number and duration (i.e., size) of segments, buffer size, segment representation, etc., can be used.

Given the BMs of a node and its partners, a schedule is generated for fetching the expected segments from the partners. For homogenous and static networks simplified scheduling such as a "round-robin" approach can be used. For a dynamic and heterogeneous network such as the Internet, a preferred embodiment uses a more intelligent scheduler. Specifically, the scheduling algorithm is designed to meet constraints of (1) the playback deadline for each segment, and (2) the heterogeneous streaming bandwidth from the partners. If the first constraint cannot be satisfied, then the number of segments missing deadlines should be kept to a minimum so as to maintain as continuous a playback as possible. In one embodiment a simple heuristic using fastest response time as a factor is used. Other approaches can use different scheduling rules. For example, scheduling can be solved as a variation of parallel machine type of scheduling.

A preferred scheduling approach first calculates the number of potential suppliers for each segment desired by a target node where a potential supplier is a target node's partner that has the desired segment in that partners' buffer. If a segment can not be retrieved in time from partner nodes then a target node may request new partners as future suppliers. Or the target node can request the segment from non-partner nodes. Since obtaining a segment with less potential suppliers would likely be more difficult to obtain, the algorithm determines the supplier of each segment starting from those with only one potential supplier, then those with two, and so forth. Among the multiple potential suppliers, the one with the highest bandwidth and enough available time is selected. A pseudo-code example of a scheduling algorithm is shown in Table I.

TABLE I

[BEGIN TABLE I]
Input:
    band(k) : bandwidth from partner k;
    bm[k] : buffer map of partner k;
    deadlin[i] : deadline of segment i;
    seg size : segment size;
    num _partners : number of partners of the node;
    set_partners : set of partners of the node;
    expected_set : set of segments to be fetched.
Scheduling:
    for segment i ∈ expected_set do
        n ← 0
        for j to num_partners do
            T[j , i] ← deadline[i] – current_time;
                //available time for transmitting segments till i;
            n ← n + bm[j , i];
                //number of potential suppliers for segment i;
        end for j;
        if n = 1 then     //segments with only one potential supplier;
            k ← argr{bm[r , i] = 1};

TABLE I-continued supplier[i] ← k,
            for j ∈ expect_set, j > k do
                t[k, j] ← t[k, j] – seg_size/band[k];
            end for j;
        else
            dup_set[n] ← dup_set[n] ∪ {i};
            supplier[n] ← null;
        end if;
    end for i;
    for n = 2 to num_partners do
    for each i ∈ dup_set[n] do
        //segments with n potential suppliers;
        k ←
            argr {band(r) > band(r') | t[r; i] > seg_size/band[r],
            t[r', i] > seg_size/band[r'], r, r' ∈ set_partners};
        if k ≠ null then
            supplier[i] ← k
            for j ∈ expected_set, j > k do
                t[k, j] ← t[k, j] – seg_size/band[k];
            end for j;
        end if;
    end for i;
  end for n;
Output:
    supplier[i] :supplier for unavailable segment i ∈ expected_set.

Given a schedule, the segments to be fetched from the same supplier are marked in a sequence table with a bit format similar to the structure of the BM described above. The sequence table is sent to that supplying partner node and the marked segments are then delivered in order through a real-time transport protocol. In a preferred embodiment the Transfer Control Protocol (TCP)-Friendly Rate Control (TFRC) protocol is used. However, any suitable protocol, sequence table format, bit format, or other specific design can be employed. The BM and scheduling results can also be inserted into or with other data packets to achieve fast and low-overhead updates. In the preferred embodiment a target node determines which segments it needs and requests the segments from a partner node. In other embodiments the determination of needed segments can be calculated by a different node or process such as a supplying node, or a different node or process that is neither a sender nor receiver of the segment. For example, a supplying (partner) node may estimate or predict that the target node may need some packets and continue the sending process.

Note that the origin node severs as a supplier only, and it always has all the segments available. The adaptive scheduling insures that the origin node will not be overwhelmed by requests from nodes in its partnership group. If needed, a node can also proactively control its load by advertising conservative buffer maps. For example, assume there are M partners, the origin node can set its BM advertising to the k-th partner as $$BM[id_{origin\_node}, i] = \begin{cases} 0; \text{ if } i \bmod M \neq k \\ 1; \text{ if } i \bmod M = k \end{cases}$$

that is, only the (i mod M)$^{th}$ partners will request segment i from the origin node, and the remaining segments will then be retrieved from other partners.

A node can depart either gracefully or accidentally due to crash. In either case, the departure can be easily detected after an idle time of TFRC or BM exchange and, because the probability of concurrent departures is rather small, an affected node can react through re-scheduling using the BM information of the remaining partners. Besides this built-in recovery mechanism, node "graceful" departure can require the departing node to issue a departure message which has the same format as the membership message, except that num_ partner is set to −1. For a node failure departure a partner that detects the failure issues the departure message on behalf of the failed node. The departure message is gossiped similarly to the membership message. In the node failure case, duplicated departure messages may be generated by different partners, but only the first received will be gossiped by a node and others will be suppressed. Each node receiving the message will flush the entry for the departing node, if available, from its mCache.

Target nodes can periodically establish new partnerships with nodes randomly selected from the target node's mCache. This operation helps each node maintain a stable number of partners in the presence of node departures and also helps each node discover partners of better quality. In our implementation, calculates a score for its partner node j of node i using function max $\{\hat{s}_{i,j}, \hat{s}_{j,i}\}$ g, where $\hat{s}_{i,j}$ is the average number of segments that node i retrieved from node j per unit time. A higher outbound bandwidth and more available segments of a partner lead to a better score and, because the partner can be either a supplier or a receiver, we shall take the maximum of both directions. After exploring new partners, the one with the lowest score can be rejected to keep a stable number of partners. This number, M, is an important design parameter, and its impact will be examined through both analysis and experiments.

Figure 4:
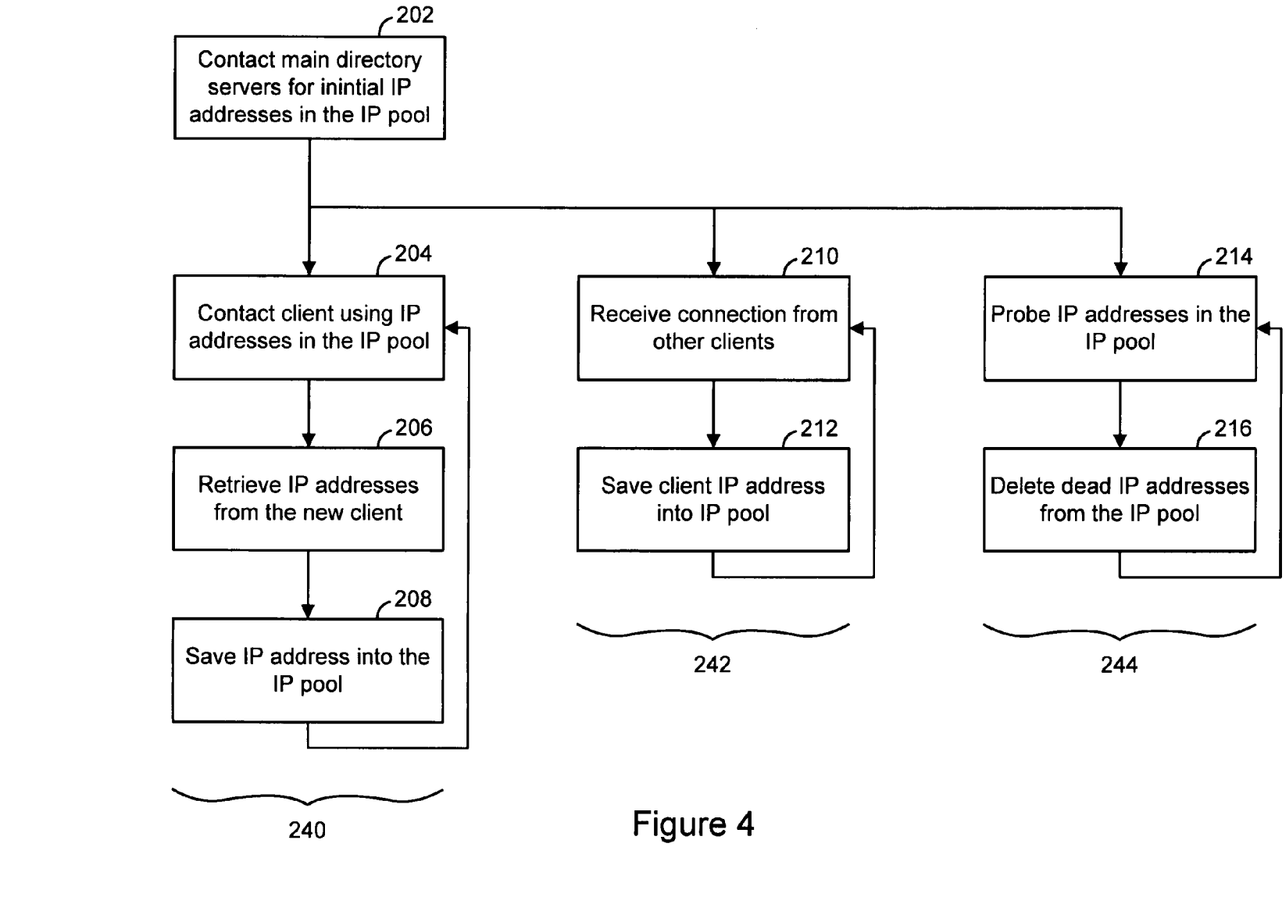
FIG. 4 is a flowchart for a routine that is executed when a node joins the overlay network.

FIG. 4 shows a flowchart for a routine that is executed when a node joins the overlay network. These steps are executed by the joining node but in other embodiments they might be performed by a process executing elsewhere. At step 202 a main directory server is contacted to obtain a list of IP addresses from a pool of addresses of potential partner nodes. By obtaining the IP addresses from the main directory server the new node can make a TCP connection to the nodes to join the network. In a preferred embodiment a joining node seeks to obtain a predetermined number of partners within a range of 2 minimum to 9 maximum. Other embodiments can use different criteria for the number of partners to obtain. Such criteria can include requirements for partners with specific characteristics such as minimum latency, bandwidth; nodes with minimum memory, processing or other resources; etc.

Each of three basic functions can be performed in the joining node. These are adding a new partner node 240, receiving a connection from a partner node 242 and deleting partner nodes. To add partner nodes the joining node contacts a first candidate by using the IP address in the list as shown at step 204. IP addresses are retrieved at step 206 and they are saved into the local IP pool of the joining node. This process repeats at step 204 to continuously monitor for candidate partner nodes by using IP addresses in the initial list or IP addresses obtained by executing steps 204-208. The process is iterative so that IP addresses added to the pool are later checked to obtain additional IP addresses.

A procedure for receiving connections from other nodes includes steps 210 and 212. At step 210 the node executing the processes of FIG. 4 receives a connection from a candidate partner node. At step 212 the IP address is added to the list of partners. Segments and schedules are propagated to the nodes in the list of partners, as described above.

Steps 214 and 216 illustrate a process for removing nodes from the lists. At step 214, IP addresses in either the IP pool or partner list are checked. If a node is non-responsive or an error message or other condition is detected then the node's IP address is removed from the list at step 216 and execution returns to step 214 for continued checking.

Figure 5:
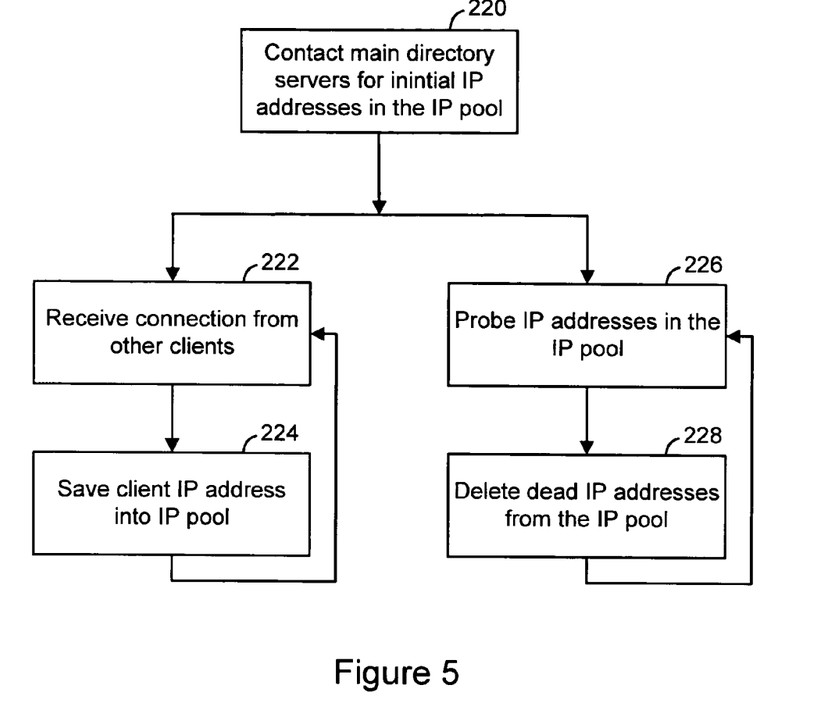
FIG. 5 is a flowchart for a routine executed by a main directory server to handle nodes joining and leaving an overlay network.

FIG. 5 shows a flowchart for a process executed by a main directory server to maintain an updated list of IP addresses for candidate nodes. At step 220 the server contacts other directory servers for an initial list of addresses. A first server starts with a list that includes its own IP address. When a new node joins and receives the list it may only include the first server's IP address. The list is built up over time according to the processes described in the flowcharts of FIGS. 4 and 5. At steps 222 and 224 connection requests are received from new joining nodes and are saved into the pool. Steps 226 and 228 are executed to probe the IP addresses in order to delete "dead" or non-responsive or undesirable IP addresses from the pool. The loops of 222-224 and 226-228 illustrate that these operations are ongoing.

Figure 6:
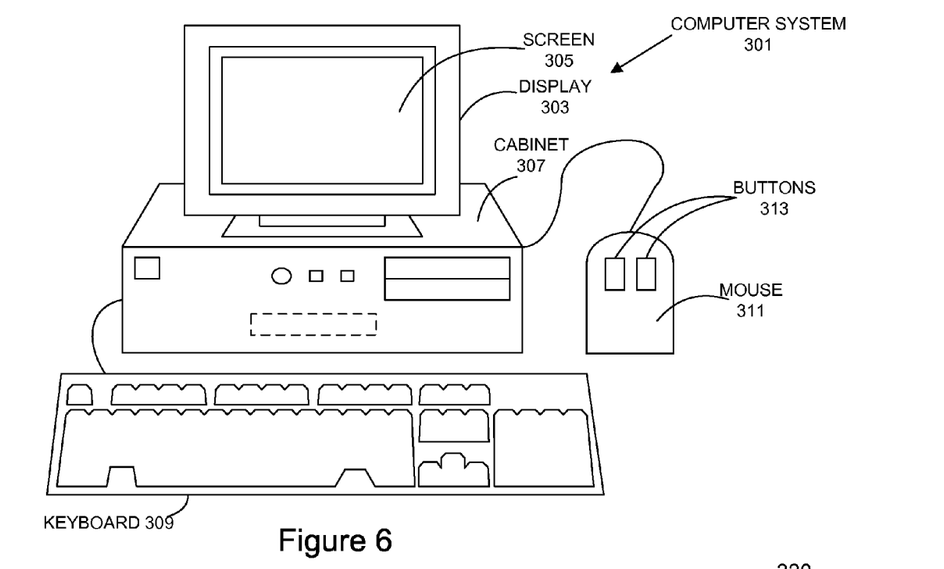
FIG. 6 is an illustration of a computer system.
Figure 7:
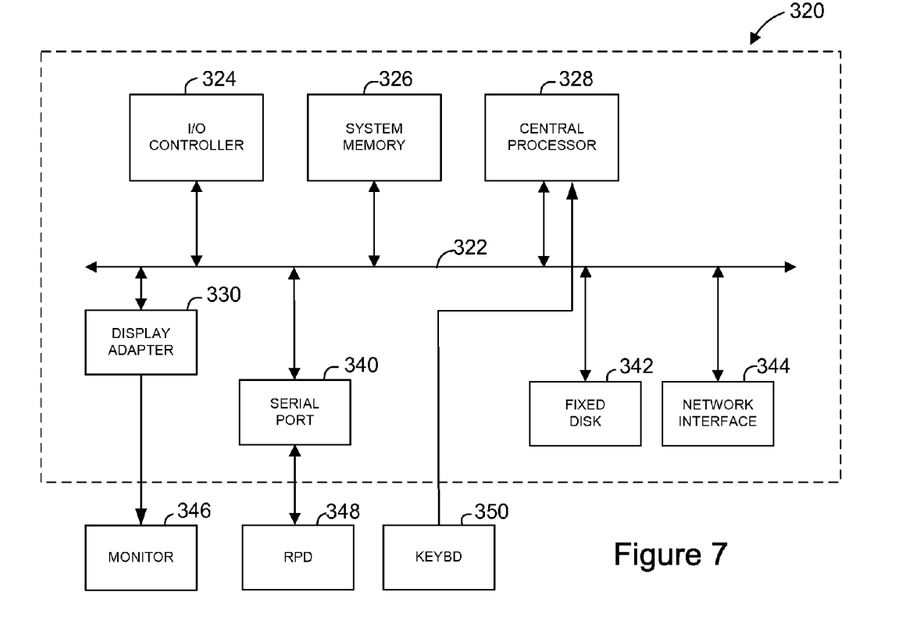
FIG. 7 illustrates subsystems that might typically be found in a computer.
Figure 8:
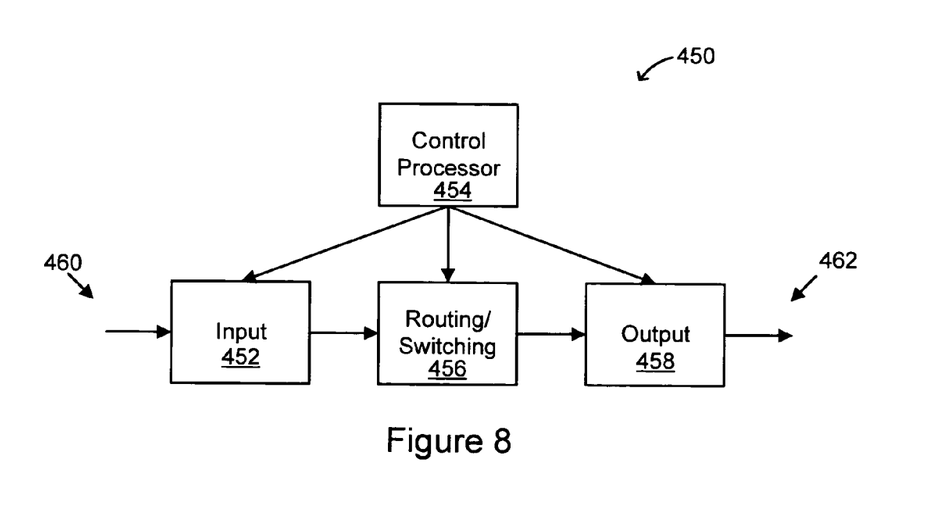
FIG. 8 shows a block diagram of hardware components that might be included in a router node.

FIGS. 6-8 show examples of types of nodes that can execute processes according to aspects of the invention. Any other suitable type of node can be used.

FIG. 6 is an illustration of computer system 301 including display 303 having display screen 305. Cabinet 307 houses standard computer components (not shown) such as a disk drive, CDROM drive, display adapter, network card, random access memory (RAM), central processing unit (CPU), and other components, subsystems and devices. User input devices such as mouse 311 having buttons 313, and keyboard 309 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 7 illustrates subsystems that might typically be found in a computer such as computer 301 of FIG. 6. In FIG. 7, subsystems within box 320 are directly interfaced to internal bus 322. Such subsystems typically are contained within the computer system such as within cabinet 307 of FIG. 6. Subsystems include input/output (I/O) controller 324, System Memory (or random access memory "RAM") 326, central processing unit CPU 328, Display Adapter 330, Serial Port 340, Fixed Disk 342, Network Interface Adapter 344. The use of bus 322 allows each of the subsystems to transfer data among subsystems and, most importantly, with the CPU. External devices can communicate with the CPU or other subsystems via bus 322 by interfacing with a subsystem on the bus. Thus, Monitor 46 connects with Display Adapter 330, a relative pointing device (e.g. a mouse) connects through Serial Port 340. Some devices such as Keyboard 350 can communicate with the CPU by direct means without using the main data bus as, for example, via an interrupt controller and associated registers.

Many subsystem configurations are possible. FIG. 7 is illustrative of but one suitable configuration. Subsystems, components or devices other than those shown in FIG. 7 can be added. A suitable computer system can be achieved without using all of the subsystems shown in FIG. 7. For example, other subsystems such as a CDROM drive, graphics accelerator, etc. can be included in the configuration without affecting the performance of the system of the present invention.

FIG. 8 shows a block diagram of hardware components that might be included in a router node. In FIG. 8, router 450 includes control processor 454 for controlling other subsystems and components in the router such as input 452, routing/switching 456 and output 458. Control processor 454 can include any number and type of processing devices, data and instructions. Control processor 454 can include, memory, disk drives, or other types of storage; and can include communication or transmission means and other resources. Any type of suitable processing architecture can be used.

Although the invention has been discussed with reference to specific embodiments thereof, these embodiments are illustrative, and not restrictive, of the invention. For example, although embodiments of the invention are discussed primarily with respect to streaming video, aspects of the invention can be applied to any other type of content (e.g., audio, high-density (HD) video, images, data files, executable files, etc.) whether streamed or transferred in a non-streaming mode.

Various other features can be combined with the features disclosed herein. For example, information can be encoded for error detection, correction or to improve the efficiency of sharing of segments. Encoding can be by any suitable means including that disclosed in the paper "Network Coding for Large Scale Content Distribution," IEEE Infocom 2005, "C. Gkantsidis and P. Rodriguez.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium or transmission that can contain, store, communicate, propagate, or transport the program for use by or in connection with the instruction execution system, apparatus, system or device. The computer readable carrier can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in the following claims and/or to the particular embodiment disclosed as the best mode contemplated for carrying out this invention, but that the invention will include any and all embodiments and equivalents falling within the scope of the appended claims.

What is claimed is:

1. A method for distributing information in a digital network, wherein the digital network includes nodes coupled by communication links, the method comprising:
performing the following at each of a plurality of the nodes which are in a partnership group:
maintaining a record of other nodes in the digital network:
randomly selecting a deputy node, which associates partner nodes for a target node from the record of other nodes, thereby reducing service load at each of the plurality of nodes, wherein a partner node can transmit segments of a video stream to the target node, and wherein the video stream is divided into segments of uniform length;
maintaining a buffer map;
  wherein the buffer map is a bit sequence of a predetermined length;
  wherein the length of the bit sequence corresponds to a sliding transmission window which limits the number of segments the partner node may request; and
  wherein each bit of the buffer map indicates the availability of a corresponding segment at the partner node;
exchanging the buffer map with the partner node; and
scheduling fetching of segments of the video stream from the Partner node based on the exchanged buffer map, bandwidth of the partner node and available time for the partner node to transmit the segments; and
receiving the segments from the partner node.

2. The method of claim 1, further comprising:
receiving information at a particular node according to a scheduled transmission.

3. The method of claim 2, further comprising:
transferring information from the particular node according to the scheduled transmission.

4. The method of claim 1, wherein the buffer map is 120-bit long and corresponds to a 1-second video which is divided into 120 segments.

5. The method of claim 1, further comprising:
creating a schedule for delivery of the segments by considering a plurality of potential supplier nodes.

6. The method of claim 5, further comprising:
assigning a higher priority in the schedule to the segments that are stored at fewer numbers of potential supplier nodes.

7. The method of claim 1, further comprising:
changing the association of the partner nodes.

8. The method of claim 7, further comprising:
establishing a new partnership node for the target node.

9. The method of claim 8, wherein the step of establishing includes a substep of randomly selecting a node.

10. An apparatus for distributing information in a digital network, the apparatus comprising:
a processor coupled to the network;
a non-transitory, tangible machine-readable storage medium device including instructions executable by the processor for performing the following:
  maintaining a record of other nodes in the digital network:
  randomly selecting a deputy node, which associates partner nodes for a target node from the record of other nodes, thereby reducing service load at each of the plurality of nodes, wherein a partner node can transmit segments of a video stream to the target node, and wherein the video stream is divided into segments of uniform length;
  maintaining a buffer map;
    wherein the buffer map is a bit sequence of a predetermined length;
    wherein the length of the bit sequence corresponds to a sliding transmission window which limits the number of segments the partner node may request; and
    wherein each bit of the buffer map indicates the availability of a corresponding segment at the partner node;
  exchanging the buffer map with the partner node; and
    scheduling transmission of segments of the video stream with a partner node.

11. A non-transitory ,tangible machine-readable storage medium including instructions executable by a processor for distributing information in a digital network, machine-readable device including:
one or more instructions for maintaining a record of other nodes in the digital network, wherein the other nodes are in a partnership group;
one or more instructions for randomly selecting a deputy node to associate partner nodes for a target node from the record of other nodes, wherein a partner node can transmit segments of a video stream to the target node, and wherein the video stream is divided into segments of uniform length;
one or more instructions for maintaining a buffer map;
  wherein the buffer map is a bit sequence of a predetermined length;
  wherein the length of the bit sequence corresponds to a sliding transmission window which limits the number of segments the partner node may request; and
  wherein each bit of the buffer map indicates the availability of a corresponding segment at the partner node;
one or more instructions for exchanging the buffer map with a partner node; and
one or more instructions for scheduling fetching of segments of the video stream with the partner node based on the exchanged buffer map, bandwidth of the partner node and available time for the partner node to transmit the segments; and
one or more instructions for receiving the segments from the partner node.

12. An apparatus for distributing information in a digital network, the apparatus comprising:
means for maintaining a record of other nodes in the digital network, wherein the other nodes are in a partnership group;
means for randomly selecting a deputy node, which associates partner nodes for a target node from the record of other nodes, thereby reducing service load at each of the plurality of nodes, wherein a partner node can transmit segments of a video stream to
the target node, and wherein the video stream is divided into segments of
uniform length;
means for maintaining a buffer map;
  wherein the buffer map is a bit sequence of a predetermined length;
  wherein the length of the bit sequence corresponds to a sliding transmission window which limits the number of segments the partner node may request; and
  wherein each bit of the buffer map indicates the availability of a corresponding segment at the partner node;
means for exchanging the buffer map with the partner node; and
means for scheduling fetching of segments of the video stream from the partner node based on the exchanged buffer map, bandwidth of the partner node, and available time for the partner node to transmit the segments; and
means for receiving the segments from the partner node.

* * * * *

UNITED STATES PATENT AND TRADEMARK OFFICE
CERTIFICATE OF CORRECTION

PATENT NO. : 7,742,485 B2  Page 1 of 1
APPLICATION NO. : 11/192760
DATED : June 22, 2010
INVENTOR(S) : Xinyan Zhang It is certified that error appears in the above-identified patent and that said Letters Patent is hereby corrected as shown below:

In claim 1 (at column 11, line 16), please change the 'P' in Partner to a lower case 'p' so that the line reads: "from the partner node based on the exchanged buffer".

In claim 10 (at column 11, line 46), please delete the word "medium" so that the line reads: "device including instructions executable by the".

Signed and Sealed this
Sixth Day of March, 2012

David J. Kappos
*Director of the United States Patent and Trademark Office*